United States Patent
Liu et al.

(10) Patent No.: US 9,860,519 B2
(45) Date of Patent: Jan. 2, 2018

(54) METHOD FOR CORRECTING IMAGE PHASE

(71) Applicant: LIPS CORPORATION, Taipei (TW)

(72) Inventors: Ling-Wei Liu, Taipei (TW); Hung-Chang Tsai, Taipei (TW)

(73) Assignee: LIPS CORPORATION, Taipei (TW)

( * ) Notice: Subject to any disclaimer, the term of this patent is extended or adjusted under 35 U.S.C. 154(b) by 151 days.

(21) Appl. No.: 14/476,025

(22) Filed: Sep. 3, 2014

(65) Prior Publication Data

US 2015/0365654 A1    Dec. 17, 2015

(30) Foreign Application Priority Data

Jun. 13, 2014 (TW) .............................. 103120575 A

(51) Int. Cl.
*G01S 17/89* (2006.01)
*H04N 13/02* (2006.01)
*G01S 7/48* (2006.01)

(52) U.S. Cl.
CPC ....... *H04N 13/0271* (2013.01); *G01S 7/4808* (2013.01); *G01S 17/89* (2013.01)

(58) Field of Classification Search
CPC .... G01S 17/89; G01S 7/4808; H04N 13/0271
USPC ........................................................ 348/43
See application file for complete search history.

(56) References Cited

U.S. PATENT DOCUMENTS

| | | | |
|---|---|---|---|
| 2008/0007709 A1* | 1/2008 | Bamji | G01C 3/08 356/5.01 |
| 2015/0061509 A1* | 3/2015 | Karlicek | G06K 9/00369 315/153 |
| 2015/0288955 A1* | 10/2015 | Perry | H04N 17/002 348/187 |

OTHER PUBLICATIONS

Lindner et al., Time-of-Flight sensor calibration for accurate range sensing, Institute for Vision and Graphics, University of Seigen, Germany, Aug. 21, 2010.*
Lindner et al. "Lateral and Depth Calibration of PMD-Distance Sensors", Computer Graphics Group, University of Siegen, Germany.*
"OPT9221 Time-of-Flight Controller." Texas Instruments, Datasheet. SBAS703A. Jun. 2015 pp. 1-101.

* cited by examiner

*Primary Examiner* — Mohammed Rahaman
*Assistant Examiner* — James Boylan
(74) *Attorney, Agent, or Firm* — Huffman Law Group, PC

(57) ABSTRACT

A method for correcting an image phase of a depth camera with a lens is disclosed. The method includes the steps of: a) selecting a first reference point on an optical axis of the lens and a second reference point on an object, wherein a distance between the first and second reference points is the shortest than others; b) calculating the distance in the step a) to serve as a standard distance; c) selecting sample points on the object other than the second reference point and calculating distances between the sample points and the first reference point; d) calculating offsets and angles between a line through the first and second reference points and lines through the first reference point and sample points; and e) calculating real distances between the first reference point and sample points by values from the step d).

4 Claims, 2 Drawing Sheets

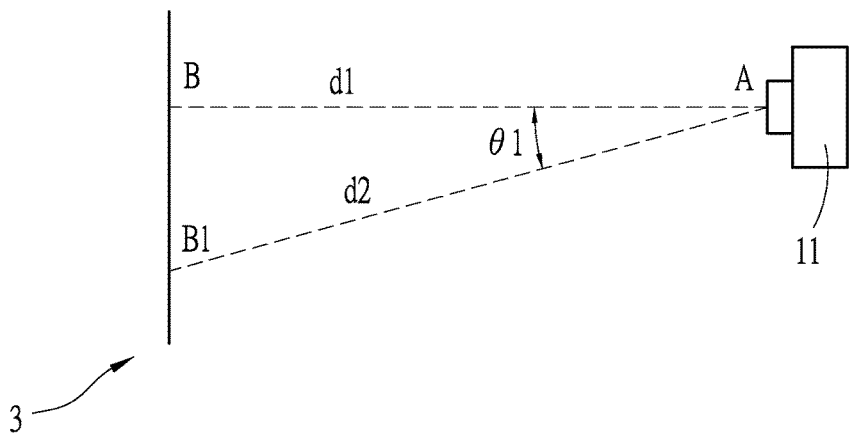

FIG. 3

| select a first reference point on an optical axis of the lens and a second reference point on an object, wherein a distance between the first and second reference points is the shortest than others | — S1 |

| calculate the distance in the step S1 to serve as a standard distance by means of the TOF principle | — S2 |

| select sample points on the object other than the second reference point and calculate respective distances between the sample points and the first reference point | — S3 |

| calculate offsets and angles between a line through the first and second reference points and lines through the first reference point and sample points | — S4 |

| calculate real distances between the first reference point and sample points by values from the step S4 | — S5 |

FIG. 4

METHOD FOR CORRECTING IMAGE PHASE

BACKGROUND OF THE INVENTION

1. Technical Field

The invention relates to image creating methods, particularly to an image creating method which corrects an image formed by the TOF principle.

2. Related Art

A depth camera can be used to control a computer through a gesture. Moreover, a depth camera can be further used to control a TV game through a body motion. This makes human-machine interaction more intuitive.

Such human-machine interaction needs a depth camera which can store a three-dimensional image into a two-dimensional format. A depth camera can measure a Z-axis distance between every shot point and the camera so that it can record three-dimensional image data.

A common method for measuring the Z-axis distance is to use the principle of time of flight (TOF). Simply speaking, a time period from a light beam emitted by a light source to be reflected by a shot point to come back to the origin can be used to calculate the Z-axis distance.

The Z-axis distance measured by the TOF principle is the distance between the lens and each shot point. Please refer to FIG. 1, distances between shot points A, B and C on a plane and the lens 100 are D1, D2 and D3, respectively. Distances D1, D2 and D3 are obtained by the formula: d=(phase-offset)R/2π. But in practice, cos θ1 and cos θ2 will have an error because of an optical error of the light source. As a result, the image cannot be created on a plane. This is a primary drawback of the TOF principle.

SUMMARY OF THE INVENTION

An object of the invention is to provide a method for correcting an image phase, which can unify the phases among all shot points and the optical axis of the lens to create a correct image.

To accomplish the above object, the method of the invention includes the steps of: a) selecting a first reference point on an optical axis of the lens and a second reference point on an object, wherein a distance between the first and second reference points is the shortest than others; b) calculating the distance in the step a) to serve as a standard distance; c) selecting sample points on the object other than the second reference point and calculating distances between the sample points and the first reference point; d) calculating offsets and angles between a line through the first and second reference points and lines through the first reference point and sample points; and e) calculating real distances between the first reference point and sample points by values from the step d).

BRIEF DESCRIPTION OF THE DRAWINGS

FIG. 3 is a schematic view of the invention;
and
FIG. 4 is a flowchart of the invention.

DETAILED DESCRIPTION OF THE INVENTION

Figure 1:
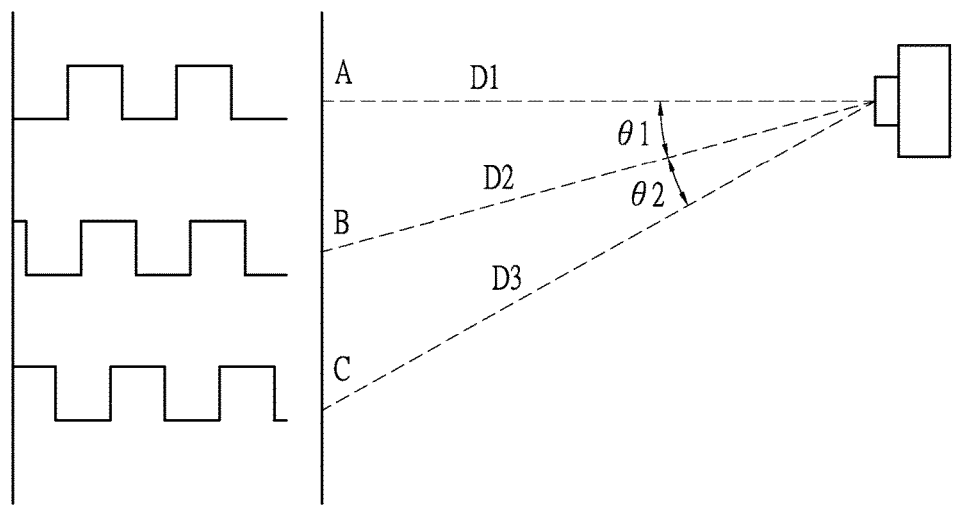
FIG. 1 is a schematic view of a depth camera in use.
Figure 2:
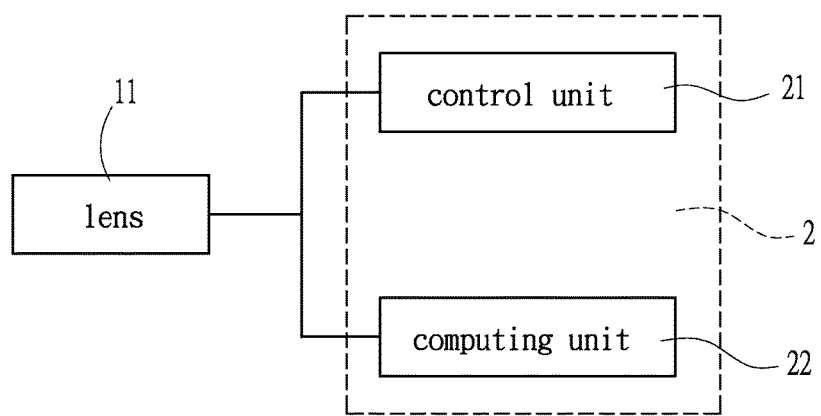
FIG. 2 is a block diagram of the depth camera of the invention.

Please refer to FIGS. 2 and 3. The depth camera 1 of the invention includes a lens 11 and a light source (not shown). The light source is composed of multiple lighting units for distance measurement. The camera 1 is electrically connected to a control module 2. There are a control unit 21 and a computing unit 22 in the control module 2. The camera 1 is controlled by the control unit 22. The computing unit 22 is used to calculate data of reflective light beams reflected by an object to create an image of the object.

FIG. 3 shows topology of the camera 1 and the object 3 in a photographing status. The control unit 21 controls the lighting units in the camera 1 to emit light beams to the object 3. The control unit 21 selects a first reference point A on an optical axis of the lens 11 and a second reference point B on an object 3, wherein a distance d1 between the first and second reference points A and B is the shortest than others. By the TOF principle, d=(phase-offset)R/2π, R=C/2F, where C stands for the speed of light, f stands for frequency, the computing unit 22 can calculate the value of the standard distance d1.

A distance d2 between the first reference point A and another sample point B1 can also be calculated by the same formula. Lines AB and AB1 forms an angle θ. A deformation function for correcting image on an X-Y plane can be utilized, i.e., Xcorrect=X(1+$K_1r^2$+$K_2r^4$+$K_3r^6$), Ycorrect=Y(1+$K_1r^2$+$K_2r^4$+$K_3r^6$), where r stands for a distance between the first reference point and a sample point, r=$\sqrt{X_d^2+Y_d^2}$, and $X_d$=r cos θ, $Y_d$=r sin θ. Finally, cosine theorem can be used to create another formula: d=(phase-offset1)R/2π×cos θ (Xcorrect, Ycorrect), where offset1 stands for a corrected offset. The corrected offset and inclined angle can be used to calculate a real distance between sample point B1 and the first reference point A. By this calculation, the offset distances between the camera 1 and all sample points can be corrected, and the distances between the camera 1 and all sample points can be unified.

Please refer to FIG. 4, which shows a flowchart of the invention. In step S1, select a first reference point on an optical axis of the lens 11 and a second reference point on an object, wherein a distance between the first and second reference points is the shortest than others. In step S2, calculate the distance in the step S1 to serve as a standard distance by means of the TOF principle. In step S3, select sample points on the object other than the second reference point and calculate respective distances between the sample points and the first reference point. In step S4, calculate offsets and angles between a line through the first and second reference points and lines through the first reference point and sample points. In step S5, calculate real distances between the first reference point and sample points by values from the step S4.

It will be appreciated by persons skilled in the art that the above embodiment has been described by way of example only and not in any limitative sense, and that various alterations and modifications are possible without departure from the scope of the invention as defined by the appended claims.

What is claimed is:

1. A method for correcting an image phase from a depth camera with a lens, comprising the steps of:
   a) selecting a first reference point on an optical axis of the lens and a second reference point on an object, wherein a distance between the first and second reference points is the shortest than others;
   b) calculating the distance in the step a) to serve as a standard distance;

c) selecting sample points on the object other than the second reference point and calculating distances between the sample points and the first reference point:

d) calculating offsets and angles between a line through the first and second reference points and lines through the first reference point and sample points; and e) calculating real distances between the first reference point and sample points by values from the step d) wherein the step e) is performed by a formula: $d=\{(\text{phase-offset1})R\}/\{(2.\pi.)(\cos\theta)(\text{Xcorrect}, \text{Ycorrect})\}$, $\theta$ is an angle formed between the first reference point and the sample points, $\text{Xcorrect}=X(1+K_1r^2+K_2r^4+K_3r^6)$, $\text{Ycorrect}=Y(1+K_1r^2+K_2r^4+K_3r^6)$, r stands for a distance between the first reference point and one of the sample points, K stands for a constant, and $R=C/2F$, where C stands for speed of light and F stands for frequency.

2. The method of claim 1, wherein the step b) is performed by a time of flight (TOF) principle.

3. The method of claim 2, wherein the TOF principle is $d=(\text{phase-offset})R/\pi$, $R=C/2F$, where C stands for the speed of light, f stands for frequency.

4. The method of claim 1, wherein a value of (Xcorrect, Ycorrect) is calculated by a deformation function.

\* \* \* \* \*